(12) United States Patent
Lee et al.

(10) Patent No.: US 9,668,291 B2
(45) Date of Patent: May 30, 2017

(54) PAIRING METHOD OF GYM SYSTEM

(71) Applicant: BeneGear Inc., New Taipei (TW)

(72) Inventors: Yung-Wen Lee, New Taipei (TW); Yang-Han Lee, New Taipei (TW)

(73) Assignee: BeneGear Inc., New Taipei (TW)

( * ) Notice: Subject to any disclaimer, the term of this patent is extended or adjusted under 35 U.S.C. 154(b) by 0 days.

(21) Appl. No.: 15/207,511

(22) Filed: Jul. 12, 2016

(65) Prior Publication Data

US 2017/0019940 A1    Jan. 19, 2017

Related U.S. Application Data

(60) Provisional application No. 62/191,540, filed on Jul. 13, 2015.

(51) Int. Cl.
| | |
|---|---|
| *H04B 7/00* | (2006.01) |
| *H04W 76/02* | (2009.01) |
| *H04W 4/00* | (2009.01) |

(52) U.S. Cl.
CPC ......... *H04W 76/023* (2013.01); *H04W 4/008* (2013.01); *H04W 76/027* (2013.01)

(58) Field of Classification Search
USPC .......................... 455/41.1–41.3, 550.1, 556.1
See application file for complete search history.

(56) References Cited

U.S. PATENT DOCUMENTS

| | | | |
|---|---|---|---|
| 8,432,260 B2 | 4/2013 | Talty et al. | |
| 8,823,545 B2 * | 9/2014 | Majava | H01Q 3/34 340/572.1 |
| 2010/0203829 A1 * | 8/2010 | Granqvist | A61B 5/0002 455/41.1 |
| 2011/0217950 A1 | 9/2011 | Kozlay | |
| 2012/0115416 A1 | 5/2012 | Yucek et al. | |
| 2014/0068725 A1 | 3/2014 | Zhang et al. | |
| 2014/0210635 A1 * | 7/2014 | Majava | H01Q 3/34 340/870.01 |

FOREIGN PATENT DOCUMENTS

| | | |
|---|---|---|
| EP | 1968028 A1 | 9/2008 |
| EP | 2536185 A2 | 12/2012 |

* cited by examiner

*Primary Examiner* — Fayyaz Alam
(74) *Attorney, Agent, or Firm* — CKC & Partners Co., Ltd.

(57) ABSTRACT

The invention provides a gym system including a plurality of stationary devices. The plurality of stationary devices is configured to establish a host monitor zone for exchanging received signal strength indicator (RSSI) values from at least one exercise portable sensor of exercise portable sensors, thereby avoiding the wireless pairing fails. The at least one of the stationary devices process the RSSI values under the host monitor zone to determine a distance status in relation to a location between the at least one exercise portable sensor and the at least one of the stationary devices to avoid the wireless pairing fails between the at least one exercise portable sensor and the at least one stationary device, so that the at least one exercise portable sensor is paired with a corresponding one of the stationary devices in a stationary device-specific exercise area.

20 Claims, 5 Drawing Sheets

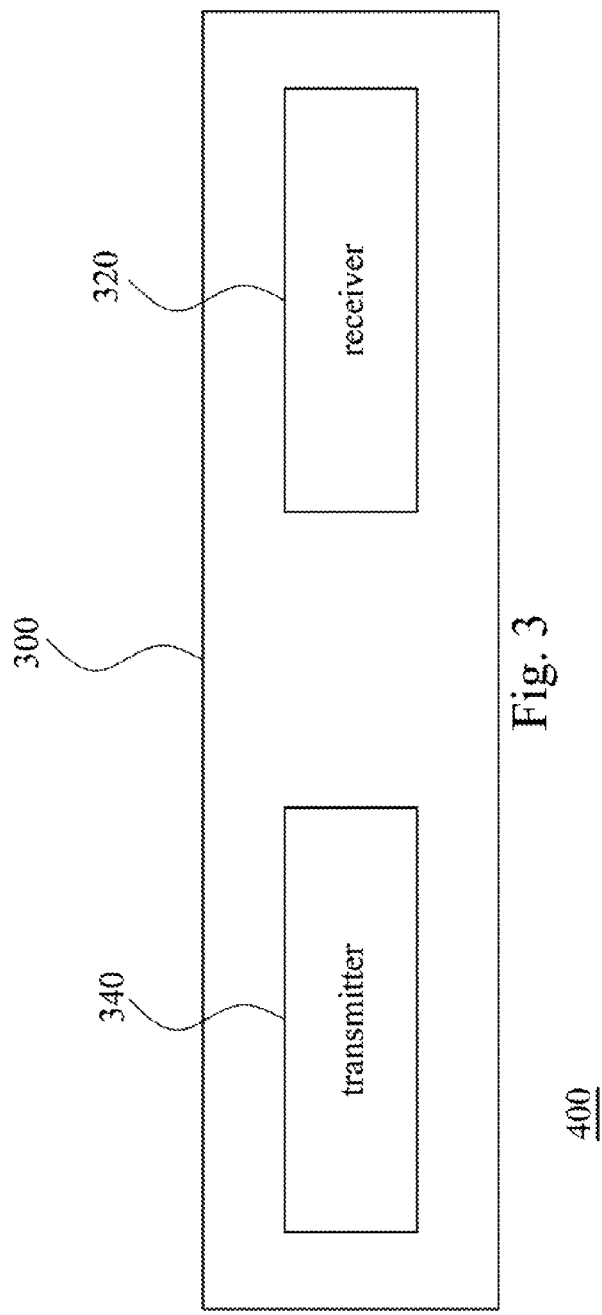
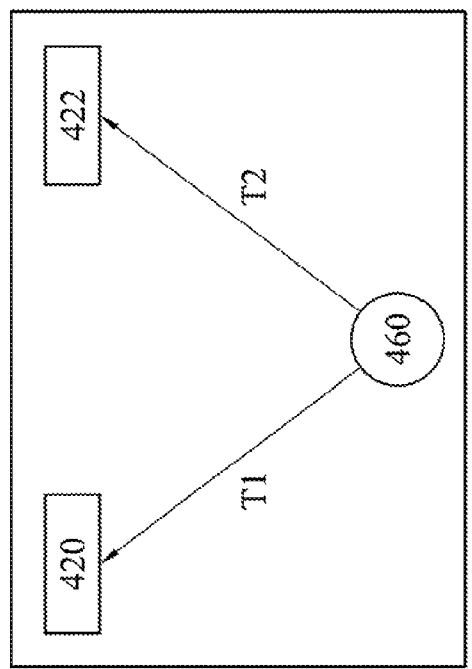

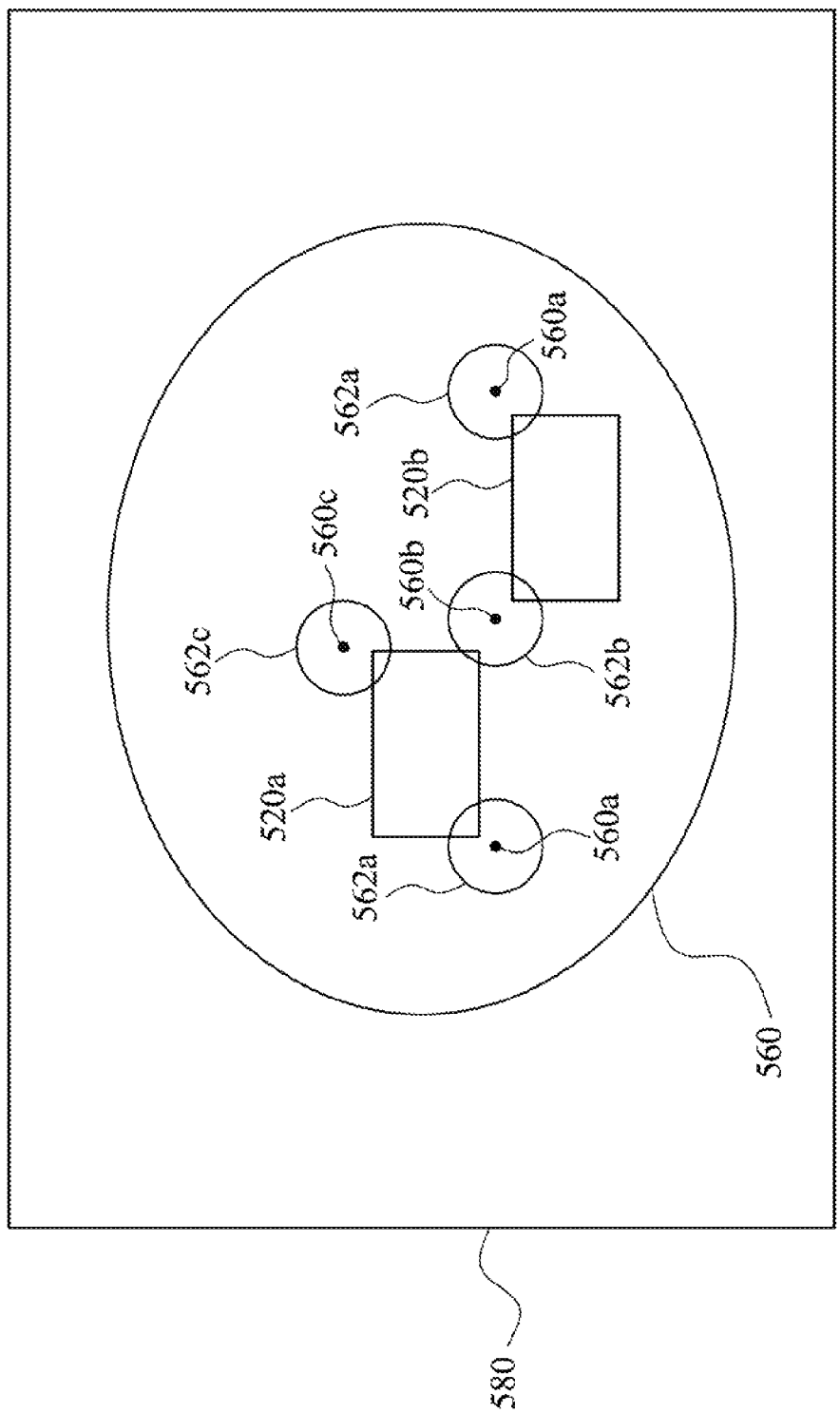

PAIRING METHOD OF GYM SYSTEM

RELATED APPLICATIONS

This application claims priority to U.S. Provisional Application Ser. No. 62/191,540, filed Jul. 13, 2015, which is herein incorporated by reference.

BACKGROUND

Field of Invention

The present invention relates to systems and methods for pairing a host device with a portable sensor. More particularly, the invention relates to pairing of an exercise device with a user terminal.

Description of Related Art

With the continuous improvement of people's living standards, exercise has become a necessary part of life. It is common to wear a portable sensor during exercise. The portable sensor may measure exercise data from the user, such as heart rate, and/or temperature, and transmits the exercise data to a gym device wirelessly. Hence, exercise data of users are displayed on specific gym devices, and the users can monitor their physical status immediately.

However, a gym environment involves a significant number of wireless transmissions by sensors of the users. Therefore, there is a high risk that a wireless coupling between an exercise sensor and a gym device fails, and a wrong user's exercise data is received by the gym device. Hence, it is important to consider techniques to minimize the above risk.

SUMMARY

According to one aspect of the invention, the invention provides a gym system including a plurality of stationary devices. The plurality of stationary devices are configured to establish a host monitor zone for exchanging received signal strength indicator (RSSI) values from at least one exercise portable sensor of exercise portable sensors, thereby avoiding the wireless pairing fails. The at least one of the stationary devices process the RSSI values under the host monitor zone to determine a distance status in relation to a location between the at least one exercise portable sensor and the at least one of the stationary devices to avoid the wireless pairing fails between the at least one exercise portable sensor and the at least one stationary device, so that the at least one exercise portable sensor is paired with a corresponding one of the stationary devices in a stationary device-specific exercise area. The stationary device-specific exercise area is an area in which an exerciser with the at least one exercise portable sensor is located while exercising with the corresponding one of the stationary devices.

According to another aspect of the invention, the invention provides a method for a gym system. The method includes: establishing a host monitor zone by using a plurality of stationary devices for exchanging a received signal strength indicator (RSSI) values from at least one exercise portable sensor of exercise portable sensors, and processing the RSSI values of the host monitor zone to determine a distance status in relation to a location between the at least one exercise portable sensor and the at least one of the stationary devices; and pairing the at least one exercise portable sensor with a corresponding one of the stationary devices in a stationary device-specific exercise area, in which the stationary device-specific exercise area is an area in which an exerciser with the at least one exercise portable sensor is located while exercising with one of the corresponding stationary devices.

According to yet another aspect of the invention, the invention provides a gym system including a plurality of stationary devices. The plurality of stationary devices are configured to receive a plurality of received signal strength indicator (RSSI) values from an exercise portable sensor and to exchange the RSSI values with each other, wherein one of the stationary devices receives a maximum RSSI value from the exercise portable sensor and therefore is paired with the exercise portable sensor, and others of the stationary devices are not paired with the exercise portable sensor.

These and other features, aspects, and advantages of the present invention will become better understood with reference to the following description and appended claims.

It is to be understood that bath the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3 illustrates a block diagram of a transceiver device according to one embodiment of the present disclosure;

FIG. 4 illustrates a block diagram of a gym system according to one embodiment of the present disclosure FIG. 5 illustrates a block diagram of a gym system according to an embodiment of the present disclosure.

DETAILED DESCRIPTION

Figure 1:
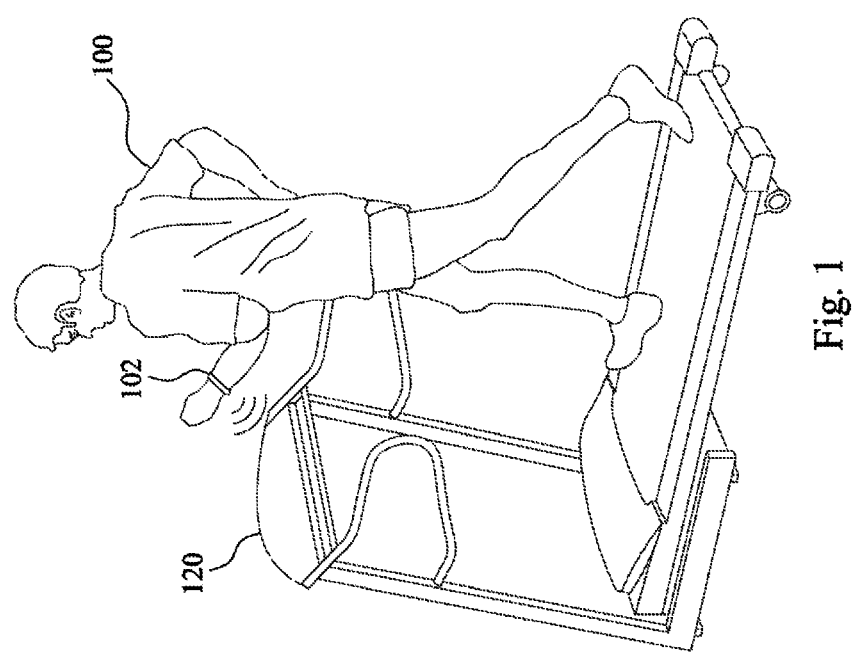
FIG. 1 illustrates a gym device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 illustrates a gym device according to one embodiment of the present disclosure. A user 100 carries out a physical exercise in a gym by using a gym device 120, e.g. treadmill, bicycles, and cross trainer. An exercise portable sensor 102 is attached to the body of the user 100 in order to measure exercise data during the exercise.

In one embodiment, the exercise portable sensor 102 is a heart activity sensor. The exercise portable sensor 102 may transmit the heart activity measurement data to the gym device 120 constantly as it is measured.

Figure 2:
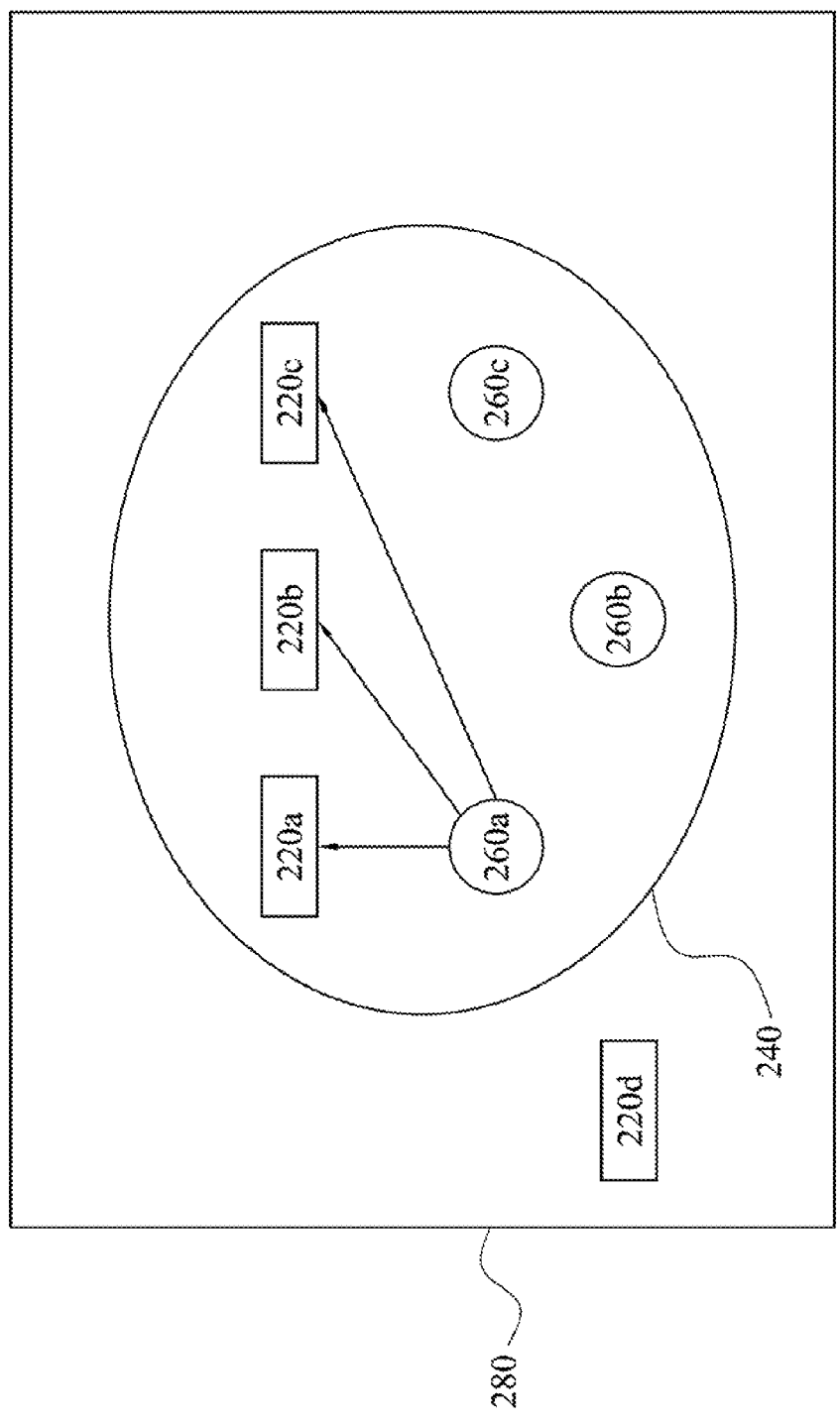
FIG. 2 illustrates a block diagram of a gym system according to one embodiment of the present disclosure.

Referring to FIG. 2, FIG. 2 illustrates a block diagram of a gym system 200 according to one embodiment of the present disclosure. The gym system 200 includes a plurality of stationary devices 220a, 220b, 220c, and 220d. In the following description, stationary devices 220 are directed to one or more of the stationary devices 220a, 220b, 220c, and 220d. The stationary devices 220 may be treadmills, bicycles, and cross trainers, but not limited thereto. For convenience and clarity, there are four stationary devices (such as 220a, 220b, 220c and 220d) in this embodiment. However, those skilled in the art can adjust the number of the stationary devices.

The stationary devices 220 are configured to establish a host monitor zone 240 for exchanging received signal strength indicator (RSSI) values from at least one exercise portable sensor of exercise portable sensors 260a, 260b and 260c. In the following description, exercise portable sensors 260 are directed to one or more of the exercise portable sensors 260a, 260b and 260c.

In one embodiment of the present disclosure, the plurality of stationary devices 220a, 220b and 220c are configured to receive a plurality of received signal strength indicator (RSSI) values from the exercise portable sensor 260a and to exchange the RSSI values with each other, in which the stationary device 220a receives a maximum RSSI value from the exercise portable sensor 260a; therefore, the stationary device 220a is paired with the exercise portable sensor 260a, and the other stationary devices 220b and 220c are not paired with the exercise portable sensor 260a.

In some approaches, gym devices are independent of each other, without above RSSI exchange manner. The gym device needs to get its own RSSI value that is compared with a predetermined threshold value. When the RSSI value is higher than the predetermined threshold value, the gym device is triggered so that it can be paired with the exercise portable sensor. However, these approaches allow above pairing occurs only when the gym device is very close to the exercise portable sensor, and thus, the predetermined threshold value is a relative high value. If the predetermined threshold value is a relative low value, the pairing distance is relative long, but when two or more gym devices exist, all of these gym devices can be paired with the exercise portable sensor, and therefore erroneous pairing occurs.

Compared to above approaches, the present disclosure does not need the predetermined threshold value. In the present disclosure, the stationary devices 220a, 220b and 220c exchange the RSSI values with each other, in which the stationary device 220a receives the maximum RSSI value from the exercise portable sensor 260a, i.e., a distance between the exercise portable sensor 260a and the stationary device 220a is shorter than a distance between the exercise portable sensor 260a and any of the stationary devices 220b and 220c. In addition, the RSSI exchange manner of the present disclosure can achieve "high sensitivity connection method." In this way, the stationary devices 220a 220b and 220c are based on the high sensitivity to remotely receive signals form a remote exercise portable sensor that is far away from these stationary devices so as to expand the range of the host monitor zone 240 to accurately perform the remote pairing.

In one embodiment of the present disclosure, the at least one of the stationary devices 220 processes the RSSI values under the host monitor zone 240, so as to determine a distance status in relation to a location between the at least one exercise portable sensors 260 and the at least one of the stationary devices 220. In this embodiment, only the stationary devices 220a~220c will exchange the RSSI values from the exercise portable sensors 260 since the stationary device 220d is outside the host monitor zone 244.

The distance status between the stationary devices 220 and the exercise portable sensors 260 is related to the RSSI values from the exercise portable sensors 260. For example, the RSSI value of the stationary device 220a from the exercise portable sensor 260a is −20 dBm, the RSSI value of the stationary device 220b from the exercise portable sensor 260a is −40 dBm, and the RSSI value of the stationary device 220c from the exercise portable sensor 260a is −50 dBm. On the other hand, since the stationary devices 220a~220c are located in the host monitor zone 240, so that the stationary devices 220a~220c may exchange the RSSI values from the exercise portable sensor 260a. Therefore, the corresponding distance between the stationary devices 220a~220c and the exercise portable sensor 260a can be calculated according to the corresponding RSSI value.

Based on the distance status in relation to the location between the exercise portable sensor 260a and the stationary devices 220a~220c, the exercise portable sensor 260a is paired with the stationary device 220a in a stationary device-specific exercise area 280. The stationary device-specific exercise area 280 is an area in which an exerciser with the at least one exercise portable sensor 260 is located while exercising with the corresponding one of the stationary devices 220. In some embodiments, the stationary device-specific exercise area 280 is a gym, fitness center, or any similar training environment.

In some embodiments, the stationary devices 220 are exercise system, exercise terminals or exercise machines. In some embodiments, the stationary devices 220 are arranged in a circle or in a line.

In some embodiments, the stationary device 220a exchanges the RSSI values from the exercise portable sensors 260 with the rest of the stationary devices 220 under the host monitor zone 240, and selects one of the exercise portable sensors 260 to connect. In some embodiments, the stationary devices 220 identify a target exercise portable sensor according to an identifier received from the exercise portable sensors 260. In which the identifier is a signal for the identification of the associated exercise portable sensors 260. For example, the identifier may be a whole or a portion of a media access control (Mac) address, but the present disclosure is not limited thereto.

In one embodiment of the present disclosure, the stationary devices 220 include at least two stationary devices for exchanging the RSSI values under the host monitor zone 240 to determine the distance status in relation to the location between the exercise portable sensors 260 and each of the at least two stationary devices 260, so that the corresponding one of the at least two stationary devices 220 targets the at least one exercise portable sensor 260.

In some embodiments of the present disclosure, the stationary devices 220 may scan the RSSI values of exercise portable sensors 260 automatically, and update a respective location periodically. Therefore, the stationary devices 220 may track the users' movements more efficiently.

In some embodiments, the stationary devices 220 identify a target exercise portable sensor from the exercise portable sensors 260 by exchanging the RSSI values under the host monitor zone 240, and select one of the exercise portable sensors 260 to be paired according to the respective value.

In some embodiments of the present disclosure, the stationary devices 220 include a plurality of transceiver devices respectively. Referring to FIG. 3, FIG. 3 illustrates a block diagram of a transceiver device 300 according to one embodiment of the present disclosure. The transceiver device 300 includes a receiver 320 and a transmitter 340. The receiver 320 is configured to determine the RSSI value of signals transmitted by the exercise portable sensors 260, and the transmitter 340 is configured to exchange the RSSI value from the exercise portable sensors 260 with other stationary devices 220.

It is common for a gym environment to include a variety of different gym devices. It may be advantageous that when the user exercises with a gym device A, the exercise portable sensor 102 is paired with the gym device A. As the user moves to a gym device B, the pairing with the gym device A is released and pairing with the gym device B is performed. The pairing should be as friendly as possible.

Referring to FIG. 4, FIG. 4 illustrates a block diagram of a gym system 400 according to one embodiment of the present disclosure. In one embodiment of the present disclosure, the gym device 400 includes a first stationary device 420 and a second stationary device 422 in which a first RSSI value T1 is the weakest RSSI signal strength which can be detected by the first stationary device 420, and a second RSSI value T2 is the weakest RSSI signal strength which can be detected by the second stationary device 422.

For example, the exercise portable sensor 460 is paired with the first stationary device 420 in the beginning. However, the exercise portable sensor 460 may leave the first stationary device 420, and the RSSI value of the stationary device 420 from the exercise portable sensor 460 will decrease. Therefore, the stationary devices 420, 422 may disregard the exercise portable sensor 460 since the exercise portable sensor 460 do not have the strongest RSSI values associated within the first RSSI value T1 and the second RSSI' value T2. Then the first stationary device 420 and the second stationary device 422 may select the exercise portable sensors which have the strongest RSSI values larger than the first RSSI value T1 and the second RSSI value T2.

In another embodiment, the stationary device 420 and the stationary device 422 may disregard the exercise portable sensors, which provide RSSI values below a predetermined threshold. Moreover, the stationary device 420 and the stationary device 422 may further select the remaining exercise portable sensors as a set of candidate exercise portable sensors to be paired. It is noteworthy that those skilled in the art can adjust the predetermined threshold.

In some embodiments, the exercise portable sensor has a corresponding sensor trigger area. Referring to FIG. 5, FIG. 5 illustrates a block diagram of a gym system 500 according to an embodiment of the present disclosure. The gym system 500 includes stationary devices 520 and exercise portable sensors 560. In this embodiment, each of the exercise portable sensors 560 has a corresponding sensor trigger area 562. In which the sensor trigger area 562 is within a stationary device-specific exercise area 580. It is noteworthy that the sensor trigger area 562 defines a detectable range of the respective exercise portable sensor 560. In other words, the exercise portable sensors 560 can trigger the stationary devices 520 by a trigger event within the sensor trigger area 562. In this embodiment, the stationary device 520a may detect the RSSI values from the exercise portable sensors 560a~560c, but regards the exercise portable sensor 560d. On the other hand, the stationary device 520b may detect the RSSI values from the exercise portable sensor 560b and the exercise portable sensor 560d, but regards the exercise portable sensor 560a and exercise portable sensor 560c.

Then the stationary devices 520 exchange the RSSI values of the exercise portable sensors 560 under a host monitor zone 560, and process the RSSI values from all the exercise portable sensors 560a~560d so as to identify a target exercise portable sensor.

In some embodiments, the users may have multiple portable devices at the same time, such as smart watch or smart phone. In this case multiple exercise portable sensors of a specific user are wirelessly coupled with the stationary device 520.

In some embodiments, a wireless transmission utilizes one of the following short-range device-to-device communication technologies: Bluetooth, Bluetooth Low Energy, wireless local area network, Area Networking Technology or Area Networking Technology+, or IEEE 802.15.4. Other short-range device-to-device or network communication protocols are equally possible. The communication range may be in the order of a couple of meters, e.g. less than five meters.

Figure 6:
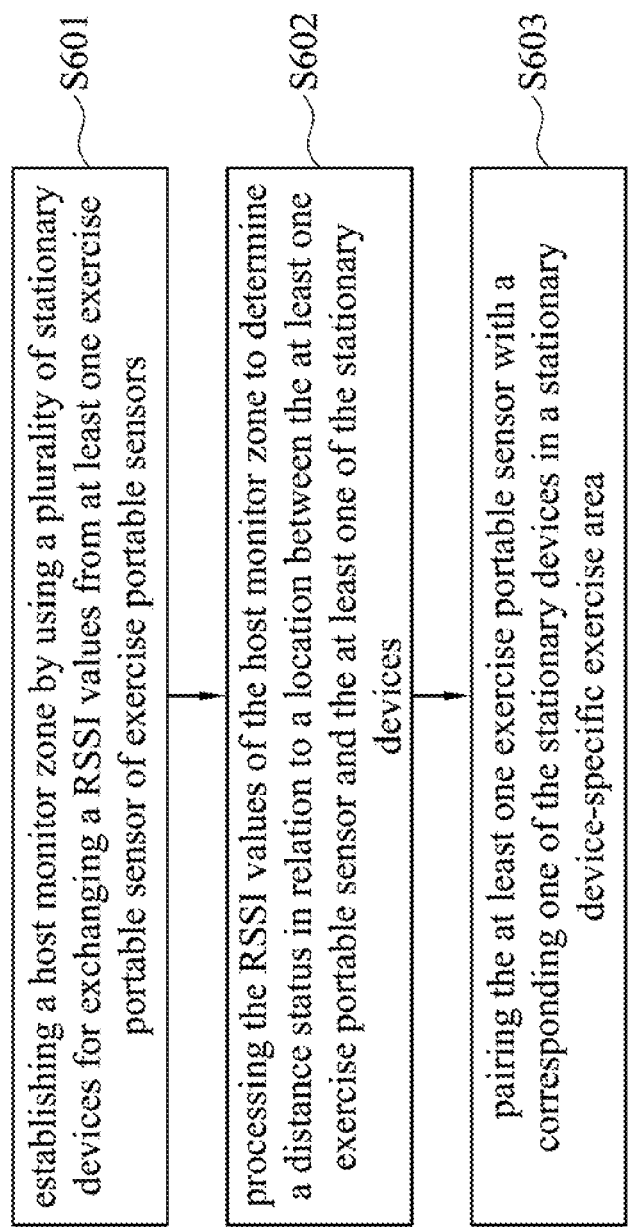
FIG. 6 illustrates a flow chart of a method of device pairing in accordance with one embodiment of the present disclosure.

Referring to FIG. 6, FIG. 6 illustrates a flow chart of a method of device pairing in accordance with one embodiment of the present disclosure. The method of device pairing may be implemented by the gym system 200 illustrated in FIG. 2, but is not limited in this regard. For convenience and clarity, it is assumed that the method of device pairing is implemented by the gym system 200 illustrated in FIG. 2.

In step S601, the plurality of stationary devices 220 establish the host monitor zone 240 for exchanging the RSSI values from the at least one exercise portable sensor of exercise portable sensors 260.

In step S602, the stationary devices 220 process the RSSI values under the host monitor zone 240 to determine the distance status in relation to the location between the at least one exercise portable sensor 260 and the at least one of the stationary devices 220.

In step S603, the stationary devices 220 are paired with the corresponding one of the stationary devices 260 in the stationary device-specific exercise area 280. The stationary device-specific exercise area 280 is an area in which an exerciser with the at least one exercise portable sensor 260 is located while exercising with the corresponding one of the stationary devices 220.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A gym system, comprising:
   a plurality of stationary devices configured to establish a host monitor zone for exchanging received signal strength indicator (RSSI) values from at least one exercise portable sensor of exercise portable sensors, thereby avoiding the wireless pairing fails, and at least one of the stationary devices processing the RSSI values under the host monitor zone to determine a distance status in relation to a location between the at least one exercise portable sensor and the at least one of the stationary devices to avoid the wireless pairing fails between the at least one exercise portable sensor and the at least one stationary device, so that the at least one exercise portable sensor is paired with a corresponding one of the stationary devices in a stationary device-specific exercise area, wherein the stationary device-specific exercise area is an area in which an exerciser with the at least one exercise portable sensor is located while exercising with the corresponding one of the stationary devices.

2. The gym system of claim 1, wherein the stationary devices comprises a plurality of transceiver devices respectively, and each transceiver device is configured to determine and exchange the RSSI value of signals transmitted by the at least one exercise portable sensor, thereby avoiding the wireless pairing fails.

3. The gym system of claim 1, wherein the stationary devices comprise at least two stationary devices for exchanging the RSSI values under the host monitor zone for avoiding the wireless pairing fails so as to determine the distance status in relation to the location between the at least one exercise portable sensor and each of the at least two stationary devices, so that the corresponding one of the at least two stationary devices targets the at least one exercise portable sensor to avoid the wireless pairing fails between the at least one exercise portable sensor and the at least one stationary device.

4. The gym system of claim 1, wherein the stationary devices comprise at least two stationary devices for exchanging the RSSI values under the host monitor zone, thereby avoiding the wireless pairing fails, wherein the processing of the at least one exercise portable sensor paired with the corresponding one of the stationary devices comprises:
    disregarding the exercise portable sensors which provide RSSI signal below a predetermined threshold value with the at least two stationary devices; and
    selecting the remaining exercise portable sensors as a set of candidate exercise portable sensors to be paired to avoid the wireless pairing fails between the at least one exercise portable sensor and the at least one stationary device.

5. The gym system of claim 1, wherein the process of the at least one of the stationary devices processing the RSSI values under the host monitor zone to determine the distance status in relation to the location between the at least one exercise portable sensor and the at least one of the stationary devices to avoid the wireless pairing fails between the at least one exercise portable sensor and the at least one stationary device, so that the at least one exercise portable sensor is paired with the corresponding one of the stationary devices comprises:
    determining that the at least one exercise portable sensor leaves the stationary device-specific exercise area upon detecting that the RSSI value from the at least one exercise portable sensor decreases below a predetermined release threshold value to avoid the wireless pairing fails between the at least one exercise portable sensor and the at least one stationary device; and
    releasing a established connection between the paired exercise portable sensor and the stationary device by the paired exercise portable sensors or by the stationary device to avoid the wireless pairing fails between the at least one exercise portable sensor and the at least one stationary device.

6. The gym system of claim 1, wherein the exercise portable sensors have a respective sensor trigger area, wherein the sensor trigger area is a detectable range of a trigger event from the exercise portable sensors,
    wherein the process of the plurality of stationary devices for exchanging the RSSI values from the at least one exercise portable sensor comprises:
    receiving the trigger event from the exercise portable sensors by the plurality of stationary devices; and
    pairing one of the exercise portable sensor from the plurality of stationary devices by the trigger event to avoid the wireless pairing fails between the at least one exercise portable sensor and the at least one stationary device.

7. The gym system of claim 1, wherein each of the stationary devices scans the RSSI values from the exercise portable sensors automatically and periodically for updating new and existing exercise portable sensors in the stationary device-specific exercise area to avoid the wireless pairing fails between the at least one exercise portable sensor and the at least one stationary device.

8. The gym system of claim 1, wherein the process of the plurality of stationary devices exchanging RSSI values from the at least one exercise portable sensor to avoid the wireless pairing fails between the at least one exercise portable sensor and the at least one stationary device, comprises:
    identifying a target exercise portable sensor for avoiding the wireless pairing fails according to an identifier received from the at least one exercise portable sensor by exchanging the RSSI values in the host monitor zone so as to avoid the wireless pairing fails between the at least one exercise portable sensor and the at least one stationary device.

9. The gym system of claim 1, wherein the process of the at least one exercise portable sensor paired with the corresponding one of the stationary devices under the host monitor zone comprises:
    selecting one of the at least one exercise portable sensor to connect according to the corresponding RSSI signal strength to avoid the wireless pairing fails between the at least one exercise portable sensor and the at least one stationary device.

10. The gym system of claim 1, wherein each of the exercise portable sensors is located in a respective sensor trigger area.

11. The gym system of claim 1, wherein at least one exercise portable sensors of a specific user are wirelessly coupled to one of the stationary devices.

12. The gym system of claim 1, wherein the stationary devices process the RSSI values from all the exercise portable sensors under the host monitor zone to avoid the wireless pairing fails between the at least one exercise portable sensor and the at least one stationary device, and identify a target exercise portable sensor for avoiding the wireless pairing fails according to an identifier received from the at least one exercise portable sensor.

13. The gym system of claim 1, wherein the exercise portable sensors are Bluetooth devices, wherein the stationary devices search for a predetermined type of Bluetooth device to identify a target exercise portable sensor for avoiding the wireless pairing fails according to an identifier received from the at least one exercise portable sensor, wherein the target exercise portable sensor is located within a sensor trigger area.

14. The gym system of claim 1, wherein the process of the plurality of stationary devices exchanging the RSSI values from the at least one exercise portable sensor to avoid the wireless pairing fails between the at least one exercise portable sensor and the at least one stationary device, comprises:
    performing automatic pairing of one of the exercise portable sensors with the corresponding stationary device under the host monitor zone to avoid the wireless pairing fails between the at least one exercise portable sensor and the at least one stationary device; and
    identifying the paired exercise portable sensor according to an identifier received from the exercise portable sensor, thereby avoiding the wireless pairing fails.

15. The gym system of claim 1, wherein the stationary devices are exercise systems, exercise terminals or exercise machines.

16. The gym system of claim 1, wherein the stationary devices are arranged in a circle, in a line or arbitrary arrangement to avoid the wireless pairing fails between the at least one exercise portable sensor and the at least one stationary device.

17. The gym system of claim 1, wherein the stationary devices communicate heart activity data wirelessly with the paired exercise portable sensors by a short-rage device-to-device communication technology.

18. The gym system of claim 1, wherein the stationary devices communicate with the exercise portable sensors by a short-range device-to-device technology, wherein the short-range device-to-device technology comprises at least one of: Bluetooth, Bluetooth Low Energy, wireless local area network, Area Networking Technology or Area Networking Technology+, or IEEE 802.15.4.

19. A method for a gym system, the method comprising:
  establishing a host monitor zone by using a plurality of stationary devices for exchanging a received signal strength indicator (RSSI) values from at least one exercise portable sensor of exercise portable sensors, and processing the RSSI values under the host monitor zone to determine a distance status in relation to a location between the at least one exercise portable sensor and the at least one of the stationary devices; and pairing the at least one exercise portable sensor with a corresponding one of the stationary devices in a stationary device-specific exercise area, wherein the stationary device-specific exercise area is an area in which an exerciser with the at least one exercise portable sensor is located while exercising with the corresponding one of the stationary devices.

20. A gym system, comprising:

a plurality of stationary devices configured to receive a plurality of received signal strength indicator (RSSI) values from an exercise portable sensor and to exchange the RSSI values with each other, wherein one of the stationary devices receives a maximum RSSI value from the exercise portable sensor and therefore is paired with the exercise portable sensor, and others of the stationary devices are not paired with the exercise portable sensor.

* * * * *